(12) United States Patent
Nakazawa et al.

(10) Patent No.: US 9,762,826 B2
(45) Date of Patent: Sep. 12, 2017

(54) PHOTOELECTRIC CONVERSION ELEMENT, IMAGE READING DEVICE, IMAGE FORMING APPARATUS, AND PHOTOELECTRIC CONVERSION METHOD

(71) Applicants: Masamoto Nakazawa, Kanagawa (JP); Tohru Kanno, Osaka (JP)

(72) Inventors: Masamoto Nakazawa, Kanagawa (JP); Tohru Kanno, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 180 days.

(21) Appl. No.: 14/873,628

(22) Filed: Oct. 2, 2015

(65) Prior Publication Data

US 2016/0112660 A1    Apr. 21, 2016

(30) Foreign Application Priority Data

Oct. 16, 2014  (JP) ................. 2014-211891

(51) Int. Cl.
 *H04N 5/365* (2011.01)
 *G01J 1/44* (2006.01)
 *H04N 5/357* (2011.01)
 *H04N 5/378* (2011.01)
(52) U.S. Cl.
 CPC ......... *H04N 5/3651* (2013.01); *H04N 5/3575* (2013.01); *H04N 5/3658* (2013.01); *H04N 5/378* (2013.01)
(58) Field of Classification Search
 CPC .... H04N 5/3575; H04N 5/3658; H04N 5/378; H04N 5/3651
 USPC ...................................................... 250/208.1
 See application file for complete search history.

(56) References Cited

U.S. PATENT DOCUMENTS

| 5,408,113 | A | 4/1995 | Kanno et al. |
| 6,198,349 | B1 | 3/2001 | Kanno et al. |
| 8,031,241 | B2 * | 10/2011 | Maeda .................. H04N 5/351 348/241 |

(Continued)

FOREIGN PATENT DOCUMENTS

| JP | 2009-267971 | 11/2009 |
| JP | 2010-178117 | 8/2010 |

(Continued)

OTHER PUBLICATIONS

U.S. Appl. No. 14/745,967, filed Jun. 22, 2015.
U.S. Appl. No. 14/750,143, filed Jun. 25, 2015.

*Primary Examiner* — Seung C Sohn
(74) *Attorney, Agent, or Firm* — Oblon, McClelland, Maier & Neustadt, L.L.P.

(57) ABSTRACT

A photoelectric conversion element includes a light receiving element, a buffer unit, a current control circuit, and an elimination circuit. The light receiving element generates electrical charge according to an amount of light received. The buffer unit buffers and outputs a voltage signal according to the electrical charge generated by the light receiving element. When the buffer unit outputs the voltage signal, the current control circuit controls electric current flowing through the buffer unit so as to be a predetermined amount of electric current. The elimination circuit eliminates high-frequency components in a band equal to or higher than a predetermined band from the voltage signal output from the buffer unit.

10 Claims, 22 Drawing Sheets

(56) References Cited

U.S. PATENT DOCUMENTS

| | | |
|---|---|---|
| 2001/0040704 A1 | 11/2001 | Kanno |
| 2002/0036805 A1 | 3/2002 | Kanno et al. |
| 2002/0048470 A1 | 4/2002 | Kanno |
| 2002/0149505 A1 | 10/2002 | Kanno |
| 2004/0047007 A1 | 3/2004 | Kanno |
| 2005/0057675 A1* | 3/2005 | Lee .................. H04N 5/3597 348/308 |
| 2007/0188638 A1 | 8/2007 | Nakazawa et al. |
| 2008/0024842 A1 | 1/2008 | Tsukahara et al. |
| 2008/0068467 A1 | 3/2008 | Kanno et al. |
| 2008/0068683 A1 | 3/2008 | Kanno |
| 2008/0106748 A1 | 5/2008 | Tsukahara et al. |
| 2008/0212146 A1 | 9/2008 | Tsukahara et al. |
| 2008/0252787 A1 | 10/2008 | Nakazawa et al. |
| 2008/0297616 A1 | 12/2008 | Nagase et al. |
| 2009/0059324 A1 | 3/2009 | Nagase et al. |
| 2009/0213261 A1 | 8/2009 | Nagase et al. |
| 2009/0268050 A1 | 10/2009 | Tashiro et al. |
| 2010/0027061 A1 | 2/2010 | Nakazawa |
| 2010/0142009 A1 | 6/2010 | Tsukahara et al. |
| 2010/0171998 A1 | 7/2010 | Nakazawa |
| 2010/0231979 A1 | 9/2010 | Nagase et al. |
| 2011/0026083 A1 | 2/2011 | Nakazawa |
| 2011/0051201 A1 | 3/2011 | Hashimoto et al. |
| 2011/0063488 A1 | 3/2011 | Nakazawa |
| 2012/0008173 A1 | 1/2012 | Konno et al. |
| 2012/0092732 A1 | 4/2012 | Nakazawa |
| 2012/0224205 A1 | 9/2012 | Nakazawa |
| 2012/0235717 A1 | 9/2012 | Hirai et al. |
| 2012/0320246 A1 | 12/2012 | Ikuma et al. |
| 2013/0063792 A1 | 3/2013 | Nakazawa |
| 2013/0162870 A1 | 6/2013 | Miyoshi et al. |
| 2013/0201373 A1 | 8/2013 | Izumi et al. |
| 2014/0002151 A1 | 1/2014 | Watabe et al. |
| 2014/0002170 A1 | 1/2014 | Miyanishi et al. |
| 2014/0029065 A1 | 1/2014 | Nakazawa |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2015/0098117 A1 | 4/2015 | Marumoto et al. |
| 2015/0116794 A1 | 4/2015 | Nakazawa |
| 2015/0155875 A1 | 6/2015 | Wada et al. |
| 2015/0163378 A1 | 6/2015 | Konno et al. |
| 2015/0222790 A1 | 8/2015 | Asaba et al. |

FOREIGN PATENT DOCUMENTS

| | | |
|---|---|---|
| JP | 2011-182065 | 9/2011 |
| JP | 2015-076701 | 4/2015 |

* cited by examiner

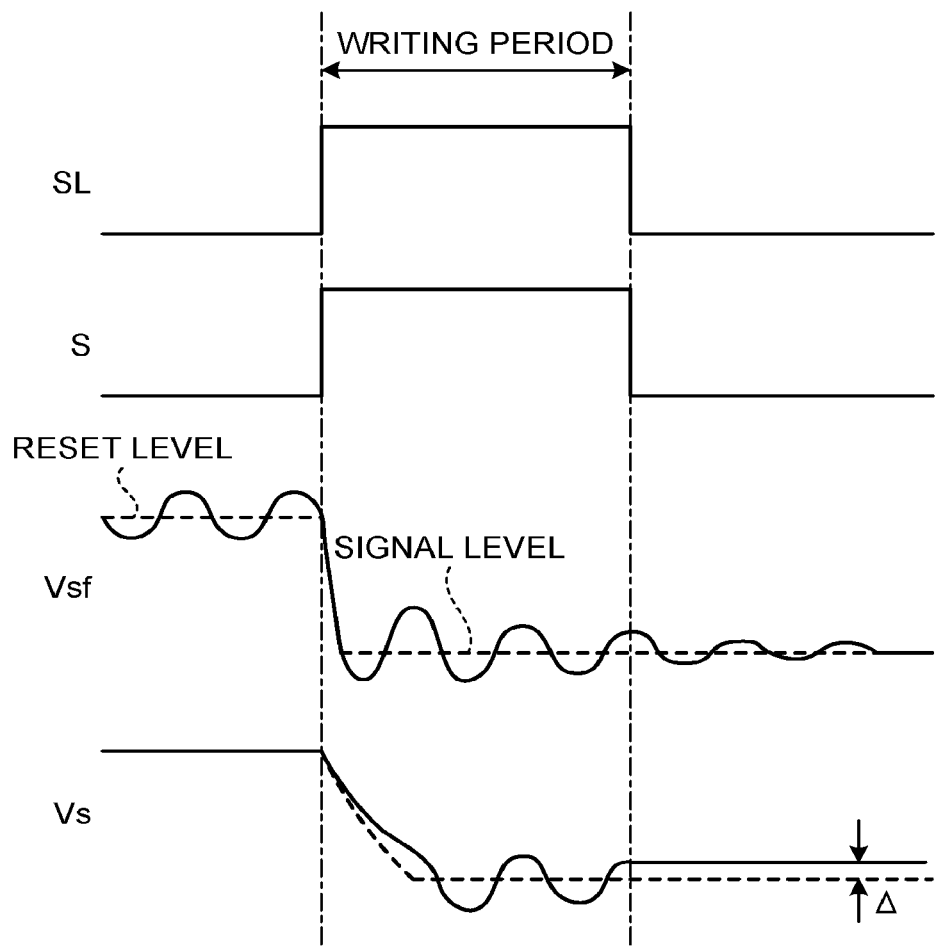

PHOTOELECTRIC CONVERSION ELEMENT, IMAGE READING DEVICE, IMAGE FORMING APPARATUS, AND PHOTOELECTRIC CONVERSION METHOD

CROSS-REFERENCE TO RELATED APPLICATIONS

The present application claims priority to and incorporates by reference the entire contents of Japanese Patent Application No. 2014-211891 filed in Japan on Oct. 16, 2014.

BACKGROUND OF THE INVENTION

1. Field of the Invention

The present invention relates to a photoelectric conversion element, an image reading device, an image forming apparatus, and a photoelectric conversion method.

2. Description of the Related Art

As a photoelectric conversion element used in a scanner, a CCD has been used conventionally; however, to cope with recent demand for speed improvement, a CMOS linear image sensor (a CMOS sensor) has attracted attention. The CMOS sensor is the same as the CCD in the point that incident light is photoelectrically converted by a photodiode (PD). However, the CMOS sensor differs from the CCD in that the CMOS sensor performs a charge-voltage conversion near a pixel and outputs the converted voltage to a subsequent stage. Furthermore, a CMOS process is used in the CMOS sensor, so the CMOS sensor can have a circuit such as an analog-digital converter (ADC) built-in, and therefore has an advantage over the CCD in high-speed performance.

A CMOS linear image sensor is composed of source followers with respect to each pixel and current loads which supply a bias current to the source followers, thereby achieving fast signal readout. However, the CMOS linear image sensor has a problem that when a current load is added, i.e., when electrical current applied to the source followers is increased, noise is worsened. Especially, high-frequency noise cannot be eliminated by correlated double sampling (CDS) and therefore causes fixed pattern noise (FPN), resulting in the occurrence of vertical stripes on an image.

To cope with the above-described problem, for example, Japanese Patent Application Laid-open No. 2010-178117 has disclosed an amplification type solid-state imaging device that outputs and writes a signal output from an amplifying transistor, which amplifies a signal output from a photoelectric conversion unit, to a capacitance in a period where the amplifying transistor goes into a metastable state since the amplifying transistor has borne only a capacitance load and, after a write switch unit performed initialization of the capacitance, has moved from a saturation region operation to a subthreshold region operation.

However, the amplification type solid-state imaging device disclosed in Japanese Patent Application Laid-open No. 2010-178117 has a problem that FPN is worsened due to a limitation on the signal response speed.

Therefore, it is desirable to provide a photoelectric conversion element, an image reading device, an image forming apparatus, and a photoelectric conversion method capable of reducing fixed pattern noise while securing the necessary response speed.

SUMMARY OF THE INVENTION

It is an object of the present invention to at least partially solve the problems in the conventional technology.

According to an aspect of the present invention, there is provided a photoelectric conversion element including: a light receiving element that generates electrical charge according to an amount of light received; a buffer unit that buffers and outputs a voltage signal according to the electrical charge generated by the light receiving element; a current control circuit that controls, when the buffer unit outputs the voltage signal, electric current flowing through the buffer unit so as to be a predetermined amount of electric current; and an elimination circuit that eliminates high-frequency components in a band equal to or higher than a predetermined band from the voltage signal output from the buffer unit.

According to another aspect of the present invention, there is provided a photoelectric conversion method performed by a photoelectric conversion element, the method including: generating, by a light receiving element, electrical charge according to an amount of light received; buffering and outputting, by a buffer unit, a voltage signal according to the electrical charge generated at the light receiving element; controlling, by a current control circuit, when the buffer unit outputs the voltage signal, electric current flowing through the buffer unit so as to be a predetermined amount of electric current; and eliminating, by an elimination circuit, high-frequency components in a band equal to or higher than a predetermined band from the voltage signal output from the buffer unit.

According to still another aspect of the present invention, there is provided a photoelectric conversion element including: light receiving means for generating electrical charge according to an amount of light received; buffer means for buffering and outputting a voltage signal according to the electrical charge generated by the light receiving means; current control means for controlling, when the buffer means outputs the voltage signal, electric current flowing through the buffer means so as to be a predetermined amount of electric current; and elimination means for eliminating high-frequency components in a band equal to or higher than a predetermined band from the voltage signal output from the buffer means.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram showing the timing at which the pixel circuit writes a signal on a memory capacitance;

DETAILED DESCRIPTION OF THE PREFERRED EMBODIMENTS

Figure 1:
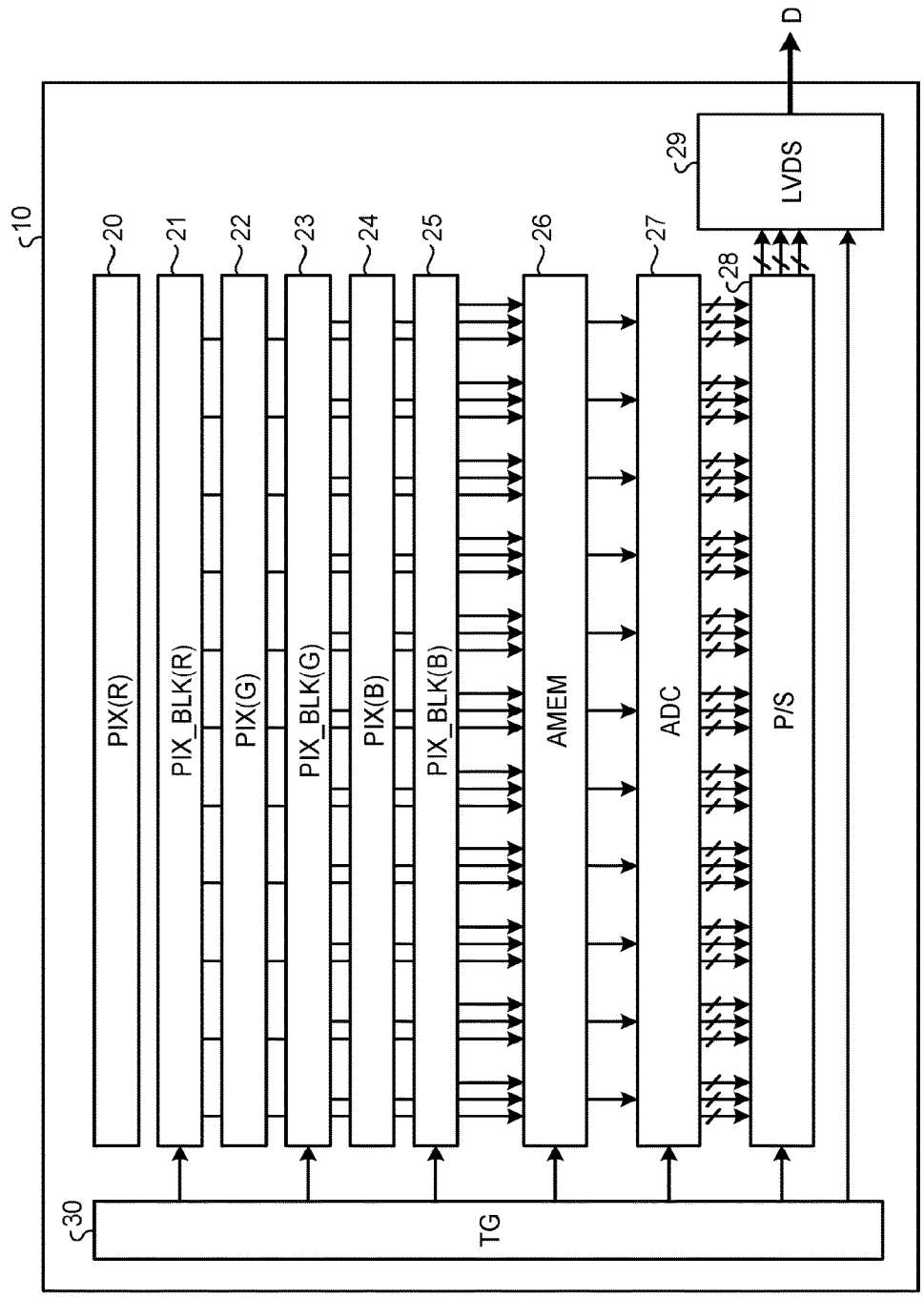
FIG. 1 is a diagram illustrating an entire configuration of a photoelectric conversion element.

First, the context that led up to the present invention is explained. FIG. 1 is a diagram illustrating an entire configuration of a CMOS linear image sensor (a photoelectric conversion element) 10. A PIX(R) 20, a PIX(G) 22, and a PIX(B) 24 each include about seven thousand PDs (photodiodes: light receiving elements), and are configured for red (R), green (G), and blue (B) colors, respectively. The PDs are arranged in one direction with respect to each color of light received, and generate an electrical charge according to an amount of light received. Furthermore, a PIX_BLK(R) 21, a PIX_BLK(G) 23, and a PIX_BLK(B) 25 each include about seven thousand pixel circuits (PIX_BLKs), and are configured for RGB colors, respectively. That is, each PD is provided with a pixel circuit (PIX_BLK).

Each pixel circuit (PIX_BLK) converts an electrical charge accumulated by a PD into a voltage signal, and outputs the signal to an analog memory through a read line. The PIX_BLK is composed of a transfer transistor that transfers the electrical charge of the PD to a floating diffusion (FD), a reset transistor that resets the FD, and a source follower transistor that buffers and outputs an FD voltage to the read line. Unlike an area sensor, a linear sensor reads out a signal from each of RGB pixels independently, so a read line exists with respect to each pixel independently.

An AMEM 26 includes, for example, about seven thousand analog memories (such as Cs to be described later) with respect to each of RGB colors, and holds a signal with respect to each pixel and sequentially outputs image signals on a column-by-column basis. As this AMEM 26 holds signals, a global shutter system in which the operation timings, i.e., the exposure timings of PIX and PIX_BLK are the same among RGB is achieved.

An ADC 27 includes as many AD converters as the number of columns, and sequentially converts image signals from analog to digital on a column-by-column basis. The ADC 27 includes as many AD converters as the number of columns and performs parallel processing, thereby achieving the speed improvement as a photoelectric conversion element while suppressing the operating speed of the AD converters.

The signals subjected to the A/D conversion by the ADC 27 are held by a parallel-serial conversion unit (P/S) 28 with respect to each pixel, and the held signals are sequentially output to an LVDS 29. On the upstream side of the P/S 28, the photoelectric conversion element 10 processes parallel data that each column of pixels in a main scanning direction have been subjected to parallel processing; on the other hand, on the downstream side of the P/S 28, the photoelectric conversion element 10 processes serial data for each of RGB colors. The LVDS 29 converts a signal output from the P/S 28 into a low-voltage differential serial signal, and outputs the converted signal to a subsequent stage. A timing control unit (TG) 30 controls the units composing the photoelectric conversion element 10.

Figure 2:
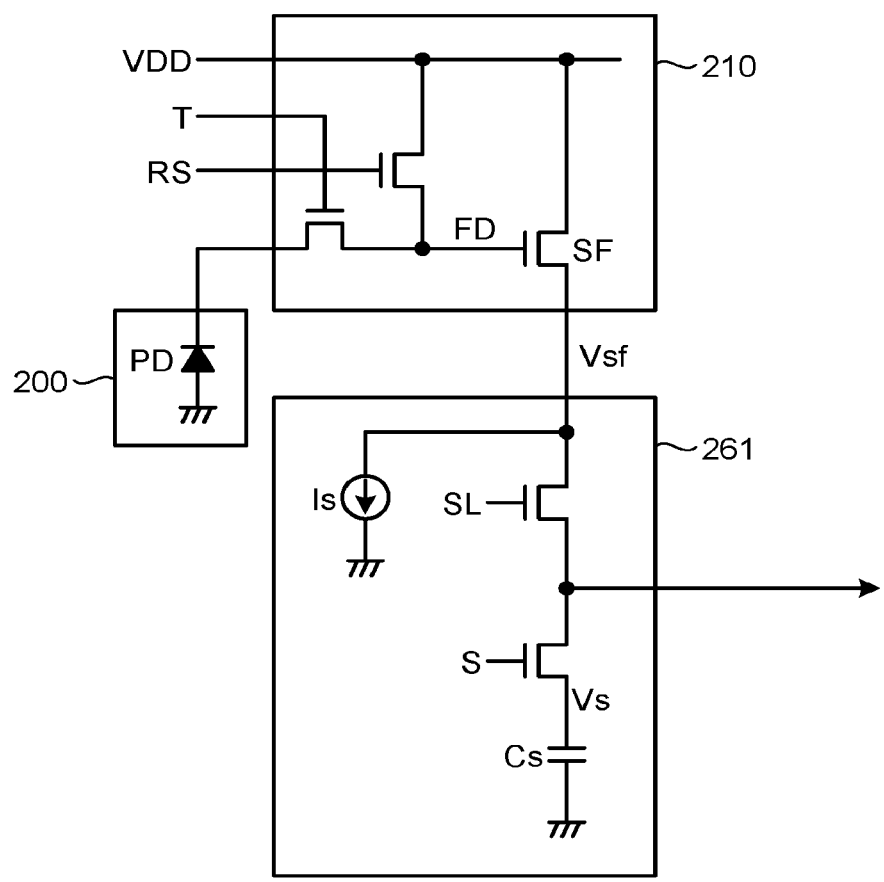
FIG. 2 is a diagram showing configurations of a pixel, a pixel circuit, and a storage unit that the photoelectric conversion element includes.

FIG. 2 is a diagram showing configurations of a pixel 200, a pixel circuit (PIX_BLK) 210, and a storage unit 261 that the photoelectric conversion element 10 includes. The pixel 200, the pixel circuit 210, and the storage unit 261 compose a pixel unit in the photoelectric conversion element 10. The photoelectric conversion element 10 includes, for example, about seven thousand pixel units per color. Specifically, in the photoelectric conversion element 10, for example, the PIX(R) 20 has about seven thousand pixels 200, the PIX_BLK(R) 21 has about seven thousand pixel circuits 210, and the AMEM 26 includes about seven thousand storage units 261. The same is true on the other colors (GB).

The pixel 200 includes a PD (a light receiving element) that photoelectrically converts an incident light. The PD outputs an accumulated electrical charge to the pixel circuit 210. The pixel circuit 210 includes a floating diffusion (FD) that performs charge-voltage conversion, a reset transistor that resets the FD, a transfer transistor that transfers an electrical charge of the PD to the FD, and a source follower (SF) that buffers and outputs a signal to a subsequent stage. The signal from the SF is read out to the subsequent stage through a read wiring. That is, the SF is a buffer unit that buffers and outputs a voltage signal according to an electrical charge generated by the PD. The pixel circuit 210 is connected to the subsequent storage unit 261.

The storage unit 261 includes a selecting switch (SL) that selects a pixel 200, a current source (Is) that supplies a bias current to the SF, a selecting switch (S) that selects the storage unit 261, and a memory capacitance (an analog memory: Cs). The storage unit 261 outputs a signal to an above-described AD converter. The current source (Is) is a current control circuit that controls the electric current flowing through the buffer unit so as to be a predetermined amount of electric current if the buffer unit outputs a voltage signal.

Incidentally, the photoelectric conversion element 10 adopts a global shutter that the operation to write on the memory capacitance (Cs) is simultaneously performed on all RGB pixels; however, from the operation of readout from the memory capacitance (Cs), the photoelectric conversion element 10 performs serial processing of sequentially reading RGB three pixels out to a subsequent stage.

FIG. 3 is a diagram showing the timing at which the pixel circuit 210 writes a signal on the memory capacitance (Cs). When the photoelectric conversion element 10 reads out a signal accumulated in a PD, an SF outputs, i.e., a signal (Vsf) is output through a read wiring, and the pixel selecting switch (SL) and the memory-capacitance selecting switch (S) are turned ON. When a light signal is read out, the signal becomes a signal of which the signal level is reduced from an initial state (a reset level) to a signal level according to the light signal.

At this time, the pixel circuit 210 can give a response about a change in the signal Vsf at high speed because the storage unit 261 includes the current source (Is), and can write the signal on the memory capacitance (Cs) at high speed. This is because an electric current required for the charge and discharge (the discharge here) of the memory capacitance (Cs) is sufficiently secured due to the current source (Is).

However, there is a problem that having a current source causes an increase in noise. This is because while a fast signal response is given by the current source, it allows to be followed by high-frequency noise. For example, when high-frequency noise has been generated just like in Vsf shown in FIG. 3, Vsf varies at writing period end timing at which writing on the memory capacitance (Cs) ends (hold timing), and a signal level (Vs) with an error (A) with respect to an original level (indicated by a dotted line in FIG. 3) is written on the memory capacitance (Cs).

At this time, an error A (generation of noise) differs from pixel to pixel in general, so fixed pattern noise (FPN) is generated, resulting in the occurrence of vertical stripes on an image. Incidentally, in FIG. 3, high-frequency noise is illustrated as single-frequency noise for the sake of convenience; however, high-frequency noise is actually white noise including various frequency components. Furthermore, although not illustrated in FIG. 3, Vsf is at a reset level while a control signal RS is ON, and becomes at a signal level when RS has turned OFF and T has turned ON.

As described above, the current source Is allows for fast signal readout, but causes a problem of FPN due to an increase in noise, resulting in deterioration in the image quality. Furthermore, the influence of high-frequency noise cannot be eliminated by correlated double sampling (CDS), and therefore it is necessary to suppress the noise.

Figure 4A:
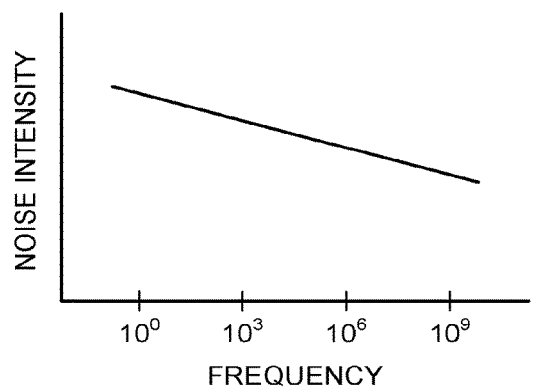
FIG. 4A is a diagram showing a noise spectrum in the photoelectric conversion element.

FIG. 4 is a diagram showing noise spectrums in the photoelectric conversion element 10. As shown in FIG. 4A, the photoelectric conversion element 10 has characteristics that noise exists in the entire frequency band and the noise intensity decreases toward the high-frequency side (1/f noise).

Figure 4B:
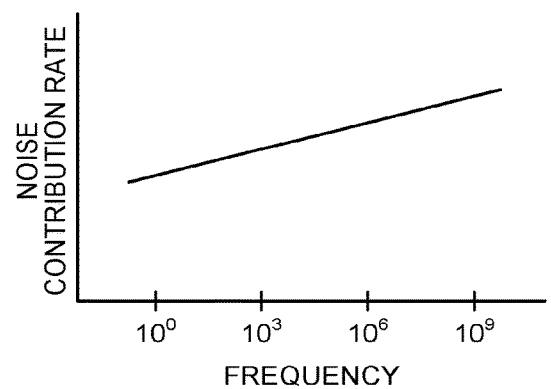
FIG. 4B is a diagram showing a noise spectrum in the photoelectric conversion element.

However, as shown in FIG. 4B, in the photoelectric conversion element 10, the band (frequency width) of cumulative noise (the product of a unit frequency and an amount of noise: an energy spectrum) is overwhelmingly wide on the high-frequency side, so the noise contribution rate increases toward the high-frequency side. Therefore, to reduce FPN or aliasing noise, it is important to suppress high-frequency noise.

Figure 5:
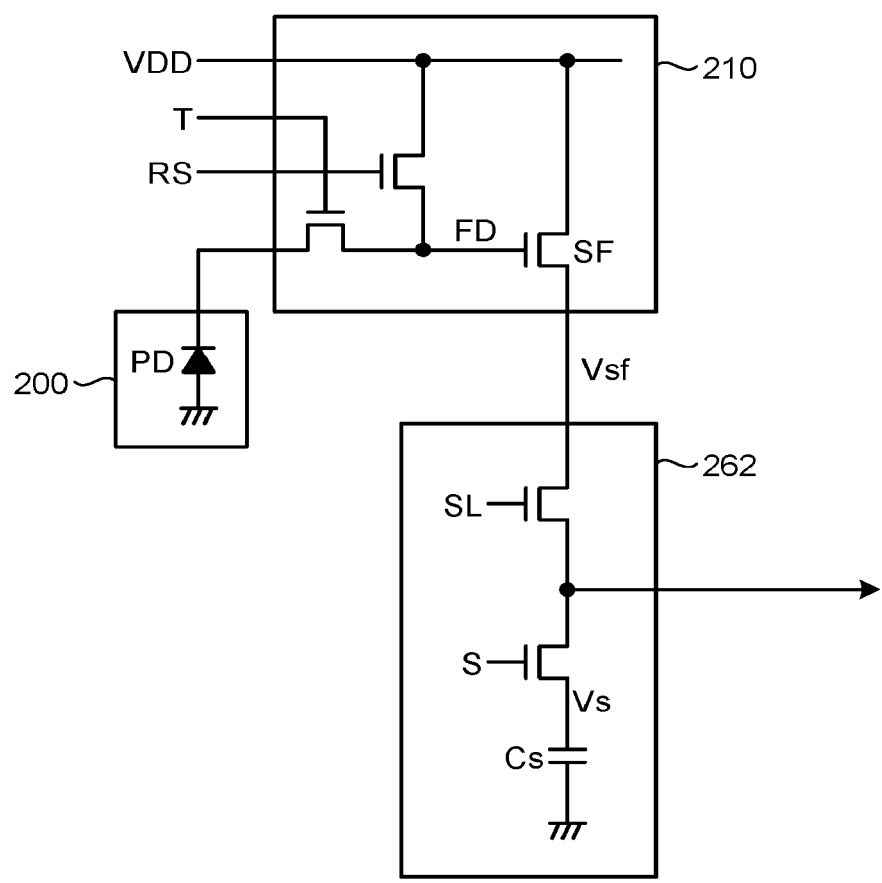
FIG. 5 is a diagram showing a configuration example of a pixel unit for reduction of noise.

FIG. 5 is a diagram showing a configuration example of a pixel unit for reduction of noise. The pixel unit shown in FIG. 5 differs from the pixel unit shown in FIG. 2 in that the pixel unit shown in FIG. 5 includes a storage unit 262 having no current source Is.

Figure 6:
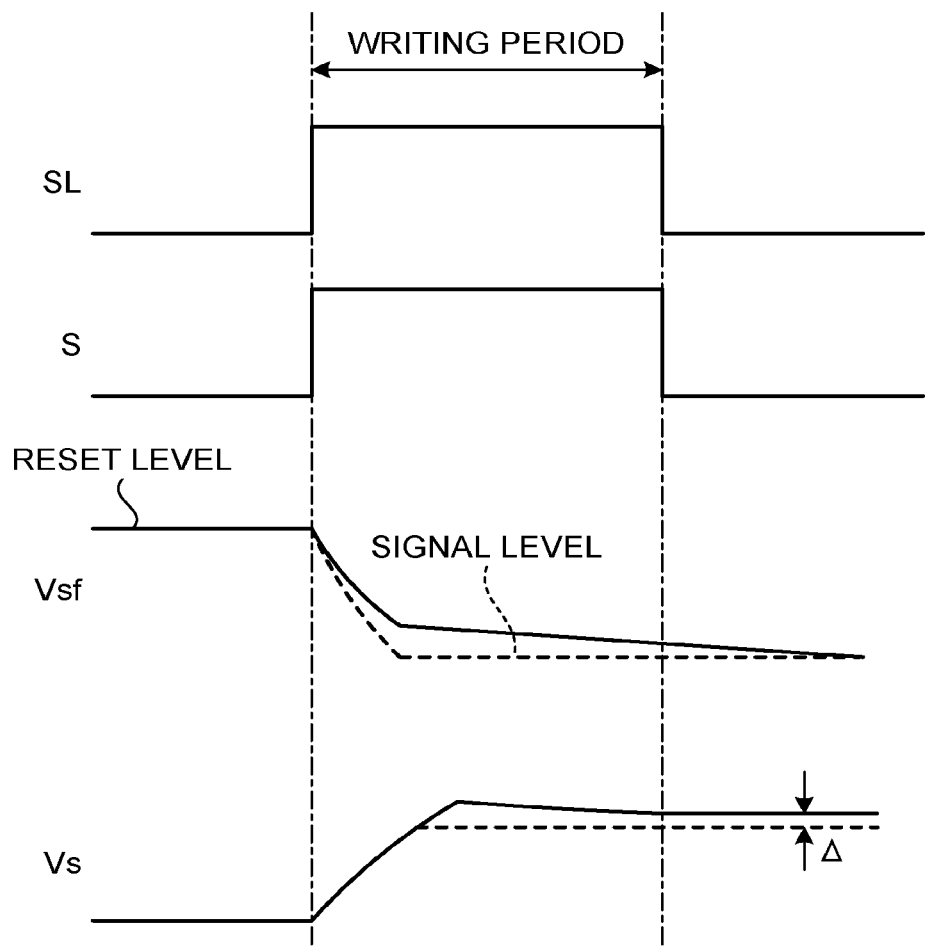
FIG. 6 is a diagram showing the state of a signal read out from the pixel circuit to the storage unit.

FIG. 6 is a diagram showing the state of a signal read out from the pixel circuit 210 to the storage unit 262. When a signal accumulated in a PD is read out, a point that an SF output (Vsf) is reduced from the initial state (the reset level) to a signal level according to a light signal is the same as in FIG. 3. However, as the storage unit 262 is not provided with a current source Is, the SF operates in a state where almost no current flows through the SF (a subthreshold region operation). Therefore, a Vsf signal response is limited, thereby the speed of signal writing on the memory capacitance (Cs) is also limited. This is because an electric current required for the charge and discharge (the discharge here) of the memory capacitance (Cs) is insufficient, so it takes time to respond.

Incidentally, an initial voltage of Vs shown in FIG. 3 is set at a low level; however, in the configuration shown in FIG. 2, there is no discharge path for the memory capacitance (Cs), so the Vs potential can change only in a direction of voltage reduction.

In a case of the above-described subthreshold region operation, the Vsf response speed, i.e., the signal band is limited. Therefore, high-frequency noise shown in FIG. 3 is suppressed, and there is no error in Vs due to noise. However, meanwhile, the signal response speed is limited; therefore, it takes time for Vsf to reach an intended level. This is not really matter when the operating speed of the photoelectric conversion element 10 is slow; however, when the photoelectric conversion element 10 performs high-speed operation, Vs is fixed (held) before it reaches an intended signal level. Therefore, just like the case shown in FIG. 3, there is an error (Δ) with respect to a signal level supposed to be written originally (indicated by a dotted line), and FPN is generated due to the limitation on a response instead of suppressing FPN caused by high-frequency noise.

As described above, when the photoelectric conversion element 10 performs the subthreshold region operation without a current source Is, noise can be suppressed; however, due to the limitation on a signal response, FPN is newly generated.

Figure 7:
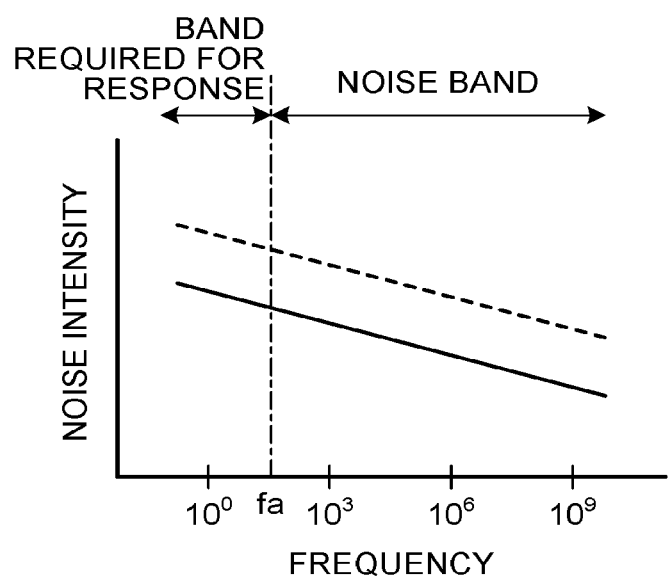
FIG. 7 is a diagram showing a noise spectrum in a photoelectric conversion element having the configuration shown in FIG. 5.

FIG. 7 is a diagram showing a noise spectrum in the photoelectric conversion element 10 having the configuration shown in FIG. 5. The noise spectrum in FIG. 7 has the same characteristics as the example shown in FIG. 4A in that noise exists in the entire frequency band and the noise intensity decreases toward the high-frequency side. However, in the configuration shown in FIG. 5, the signal responsiveness (band) is greatly limited, so noise is reduced overall.

Incidentally, a zone up to a frequency fa in FIG. 7 indicates a band required for a Vsf signal response. This is equivalent to a low-frequency side signal band, and this band being limited means that the signal responsiveness is limited.

Figure 8:
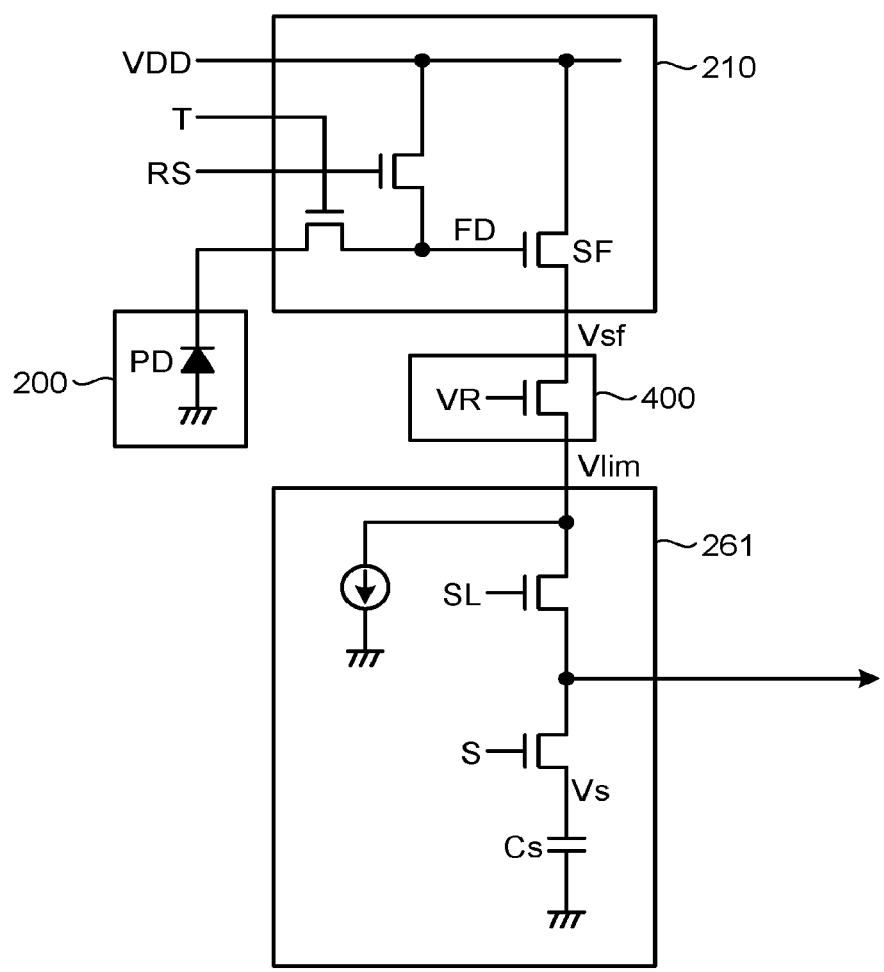
FIG. 8 is a diagram showing a configuration example of a pixel unit of a photoelectric conversion element according to an embodiment.

FIG. 8 is a diagram showing a configuration example of a pixel unit of a photoelectric conversion element according to an embodiment. To reduce FPN, a noise band has to be limited while securing the necessary signal responsiveness. In the pixel unit of the photoelectric conversion element according to the embodiment, the storage unit 261 includes a current source (Is), and the pixel unit further includes a band limiting unit 400 that limits a noise band independently of the source follower of the pixel circuit 210. Specifically, as shown in FIG. 8, the pixel unit of the photoelectric conversion element according to the embodiment is provided with the band limiting unit (LIM) 400 in a stage subsequent to the SF of the pixel circuit 210.

The band limiting unit 400 is composed of, for example, a switch (VR), and is arranged in series between the pixel circuit 210 and the storage unit 261. In the band limiting unit 400, a filter is composed of an ON resistance and memory capacitance (Cs) of the switch (VR), thereby an SF output signal band can be easily limited. That is, the band limiting unit 400 is an elimination circuit that eliminates high-frequency components in a band equal to or higher than a predetermined band from a voltage signal output from the buffer unit. A voltage by the switch (VR) is direct voltage, and the switch (VR) is always in an ON state when a signal is read out from the pixel circuit 210.

Here, a band according to the band limiting unit 400 and the memory capacitance (Cs) is set so that the noise band is limited while securing the necessary signal responsiveness (within a scope which does not affect the signal followability). Furthermore, the ON resistance of the switch (VR) is easily set to an arbitrary value by setting the switch size and a control signal voltage.

Figure 9:
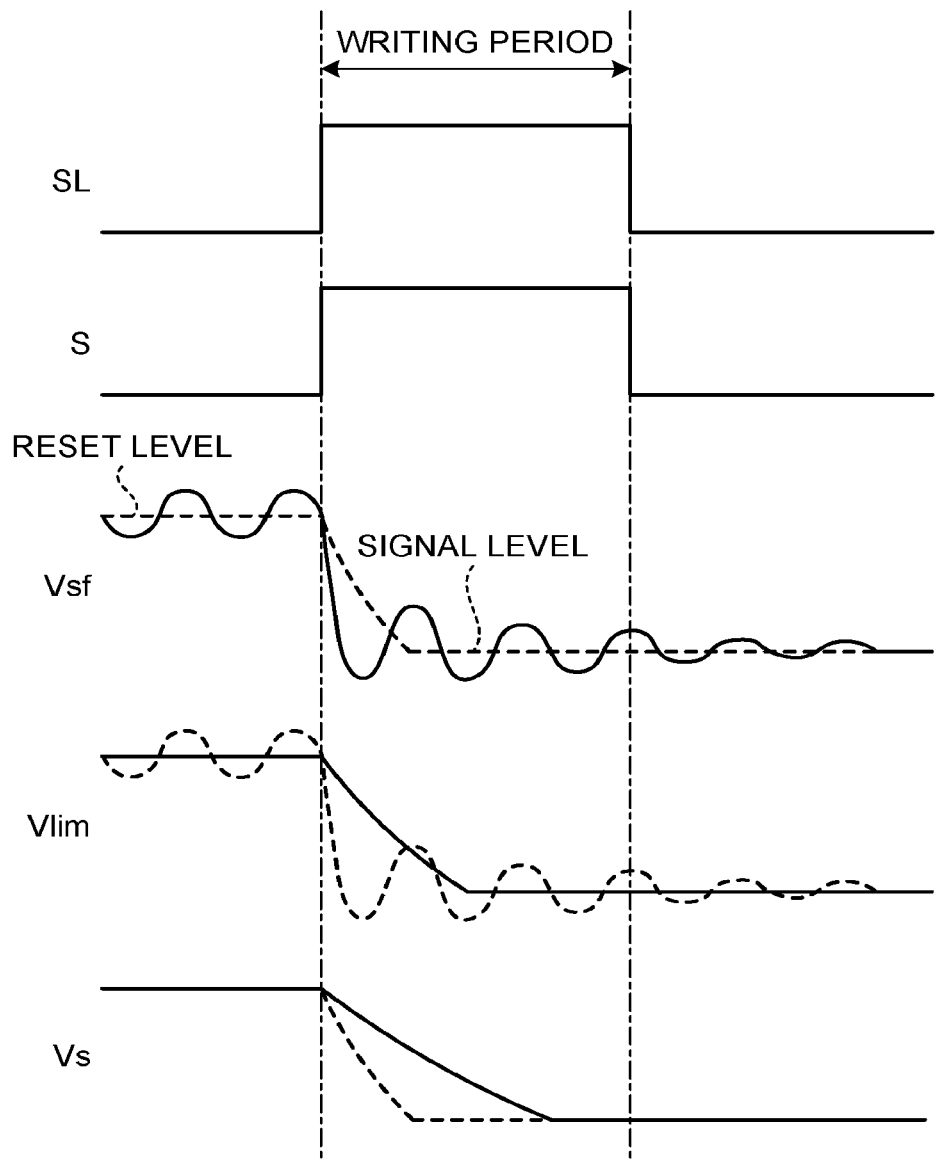
FIG. 9 is a diagram showing a signal read out from the pixel circuit to the storage unit through a band limiting unit.

FIG. 9 is a diagram showing a signal read out from the pixel circuit 210 to the storage unit 261 through the band limiting unit 400. In an example shown in FIG. 9, when a signal accumulated in a PD is read out, points that an SF output (Vsf) is reduced from the initial state (the reset level) to the signal level and high-frequency noise is superimposed on Vsf are the same as the example shown in FIG. 3.

However, the band of the high-frequency noise superimposed on Vsf is limited by the band limiting unit 400, so high-frequency noise is suppressed in Vlim. In the configuration shown in FIG. 8, the band limiting unit 400 is configured independently of the source follower, so the SF output signal band can be limited while maintaining the high-speed operation of the source follower; therefore, it is possible to optimize the limitation on a band so as not to affect the signal responsiveness (a period of writing on the memory capacitance (Cs)). Therefore, in the configuration shown in FIG. 8, a signal Vlim with noise suppressed is held in the memory capacitance (Cs) without falling into the lack of a response like in FIG. 6.

As described above, the band limiting unit 400 is provided in between the storage unit 261 including the current source Is and the pixel circuit 210, thereby it is possible to limit the band so as not to affect the period of writing on the memory capacitance (Cs); therefore, it is possible to suppress FPN caused by high-frequency noise or the lack of a response.

Figure 10:
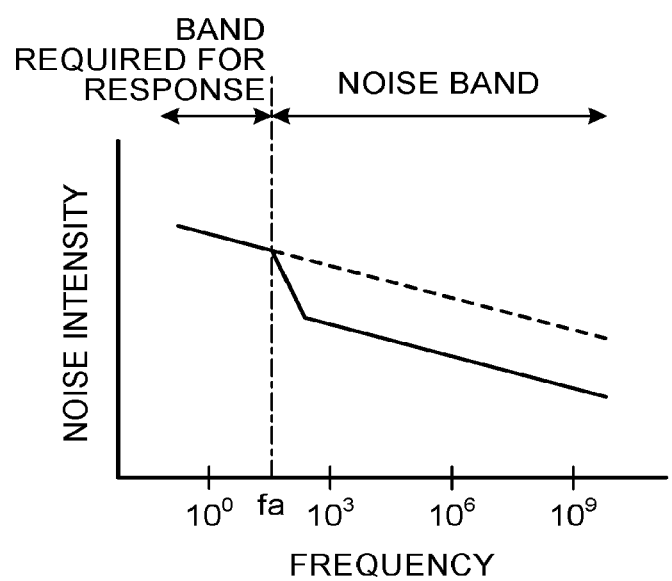
FIG. 10 is a diagram showing a noise spectrum in a photoelectric conversion element including the pixel unit shown in FIG. 8.

FIG. 10 is a diagram showing a noise spectrum in a photoelectric conversion element including the pixel unit shown in FIG. 8. The noise spectrum in FIG. 10 has the same characteristics as in FIG. 4A in that noise exists in the entire frequency band and the noise intensity decreases toward the high-frequency side. However, as shown in FIG. 10, in the configuration of the pixel unit shown in FIG. 8, noise on the high-frequency side is reduced as compared with the characteristic shown in FIG. 4A (indicated by a dotted line in FIG. 10).

Here, noise on the low-frequency side is not reduced so as to secure the signal responsiveness. However, as explained with FIG. 4, as circuit noise in the photoelectric conversion element, the high-frequency side noise is overwhelmingly large and therefore has a small effect. Incidentally, as explained with FIG. 7, the zone up to the frequency fa indicates a band required for a Vsf signal response, and the pixel unit shown in FIG. 8 optimizes the band thereby securing the Vsf responsiveness.

Figure 11:
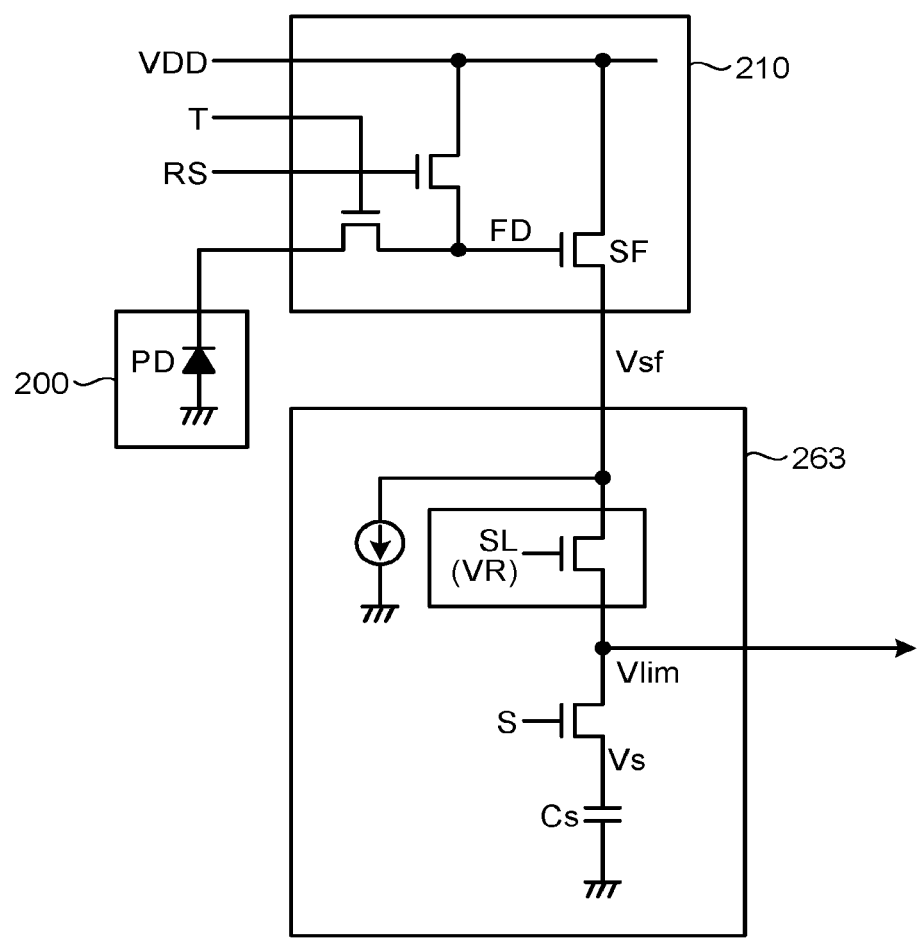
FIG. 11 is a diagram showing a configuration of a pixel unit with fewer circuits added than the configuration shown in FIG. 2.

FIG. 11 is a diagram showing a configuration of a pixel unit with fewer circuits added than the configuration shown in FIG. 2. In the configuration shown in FIG. 8, the band limiting unit 400 is provided independently of the source follower (SF); however, as shown in FIG. 11, the band can be limited by using a switch that a storage unit 263 has. That is, the storage unit 263 is configured so that a pixel selecting switch (SL) doubles as a band limiting function. When the pixel unit includes the storage unit 263, the effect of limiting the band is the same as the configuration shown in FIG. 8.

Figure 12:
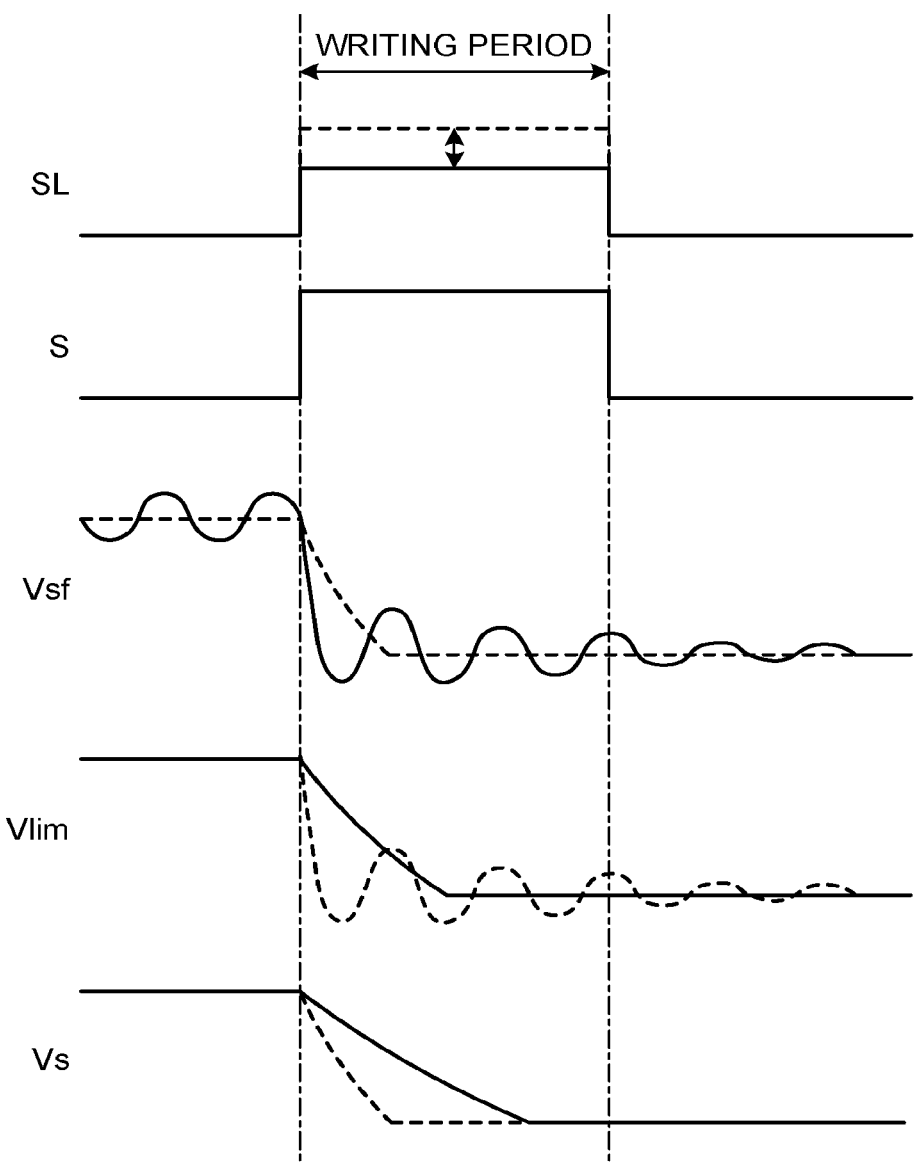
FIG. 12 is a diagram showing a signal read out from the pixel circuit to a storage unit shown in FIG. 11.

FIG. 12 is a diagram showing a signal read out from the pixel circuit 210 to the storage unit 263 shown in FIG. 11. As shown in FIG. 12, when a signal is written on the memory capacitance (Cs), control signals of the pixel switch SL and the memory selecting switch S are set to High level, thereby the pixel switch SL and the memory selecting switch S are turned ON; however, the storage unit 263 limits the band by setting the High-level control signal of the pixel switch SL to Low level.

The storage unit 263 uses a change in an ON resistance of a MOS transistor by a change in gate voltage. The storage unit 263 performs the band limitation by setting the High level of the pixel switch SL to be lower than that in the storage unit 261, thereby increasing the ON resistance. A signal input to a gate of the pixel switch SL is a control signal for switching the ON/OFF state of the pixel switch SL; this ON/OFF switching is performed in the same manner as in FIG. 3. Incidentally, the pixel switch SL (a MOS switch) of the storage unit 263 is an NMOS, so a value of High level is changed; however, when it is composed of a PMOS, a value of Low level only has to be changed. Furthermore, the gate of the pixel switch SL is a node to which an arbitrary voltage can be applied in the photoelectric conversion element 10; however, it can be a node to which an arbitrary voltage can be applied by the outside through a terminal.

The High level of a control signal input to the pixel switch SL can be changed. Accordingly, even when high-frequency noise superimposed on Vsf varies among the PDs, the band limitation can be set appropriately. When the band limitation is performed by means of the pixel switch SL (a MOS switch) included in the storage unit 263 as described above, the limited band is changed by changing the amplitude of a control signal, thereby FPN caused by individual differences among the PDs can be reduced.

Incidentally, the pixel selecting switch SL of the storage unit 263 has the function of the band limiting unit 400; alternatively, the memory-capacitance selecting switch (S) can be configured to have the function of the band limiting unit 400. Furthermore, in the storage unit 263, the ON resistance of the MOS switch is configured to be able to be changed so that the band can be changed; alternatively, a value of memory capacitance can be configured to be able to be changed.

Figure 13:
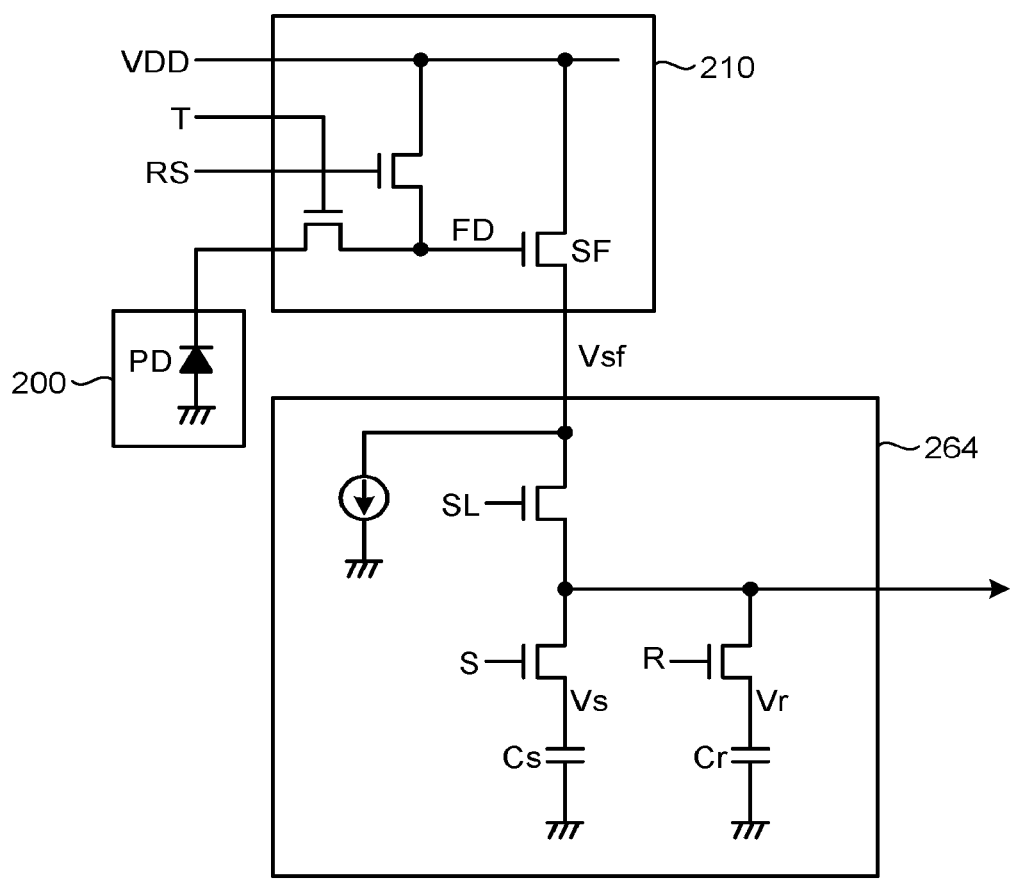
FIG. 13 is a diagram showing a configuration of a pixel unit in a photoelectric conversion element including a CDS unit.

Subsequently, a configuration of a pixel unit in a photoelectric conversion element including a CDS unit that performs correlated double sampling is explained. FIG. 13 is a diagram showing the configuration of the pixel unit in the photoelectric conversion element including the CDS unit. There is a photoelectric conversion element that realizes CDS by not only holding the signal level in a memory capacitance (Cs) of a storage unit 264 but also holding the reset level in a memory capacitance (Cr). This is a technology to correct FPN by extracting the net signal level only by subtracting the reset level from the signal level of a pixel; however, the influence of high-frequency noise cannot be eliminated by CDS.

FIG. 14 is diagram showing a reason why high-frequency noise cannot be corrected by CDS. When CDS is performed by using the pixel unit shown in FIG. 13, a memory-capacitance selecting switch R is in an ON state in a state where the pixel selecting switch SL is ON, and the reset level is first written on a memory capacitance. Then, the memory-capacitance selecting switch (S) is in an ON state, and the signal level is written.

Figure 14A:
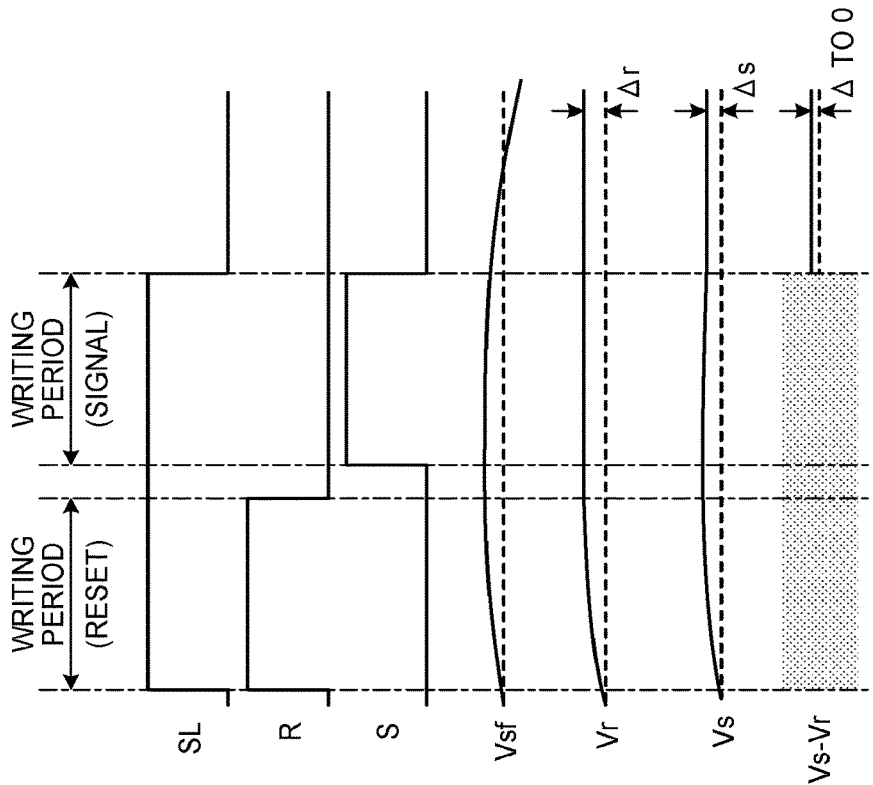
FIG. 14A is a diagram showing a reason why high-frequency noise cannot be corrected by CDS.

FIG. 14A shows a CDS operation when high-frequency noise is superimposed. At the end of a reset-level writing period, a signal is held, and Vr is determined; however, the level of Vsf at the end of writing is the same as an ideal level without noise (indicated by a dotted line), so the ideal level of Vr is written. Then, at the end of a signal-level writing period, Vs is determined; however, the Vsf level of Vs at the end of writing is a level which deviates from an ideal level due to the influence of noise, so the level of Vs deviating by $\Delta$ from the ideal level is written. As a result, Vs−Vr subtracted by CDS is left with the error A from the ideal level, and therefore the influence of high-frequency noise cannot be corrected by CDS.

Figure 14B:
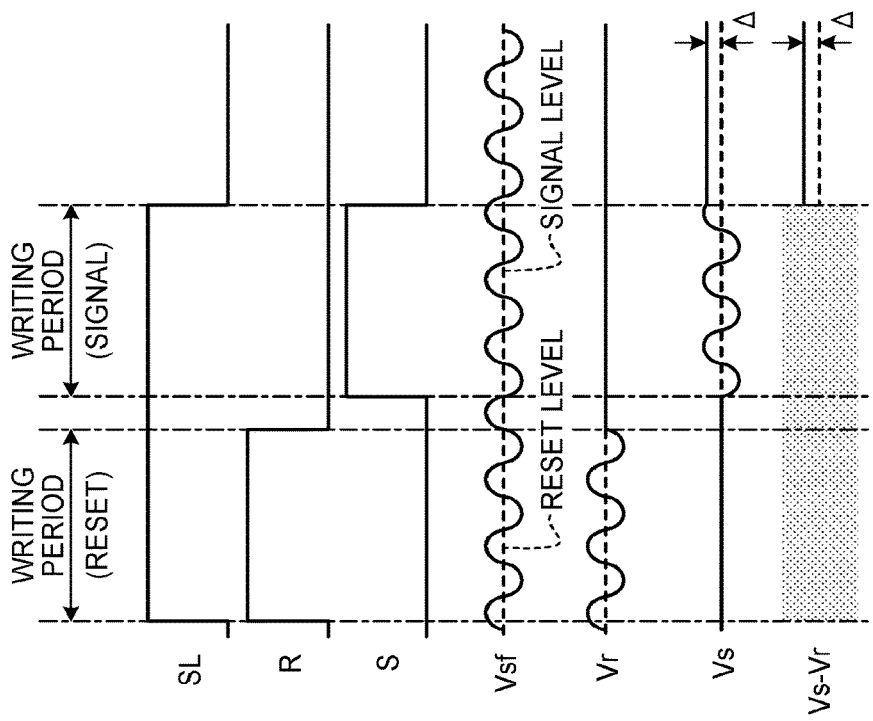
FIG. 14B is a diagram showing a reason why high-frequency noise cannot be corrected by CDS.

On the other hand, FIG. 14B shows a CDS operation when low-frequency noise is superimposed. The process of determining Vr and Vs is the same; however, the CDS operation differs in that an error ($\Delta r$) due to noise is written in Vr, and about the same error ($\Delta s$) as $\Delta r$ is written in Vs. This is because in the case of low-frequency noise, the time to change the level is long, so when a CDS sampling period (an interval between writing of the reset level and writing of the signal level) is short with respect to the noise period, there is little difference between signal variation in the reset level and signal variation in the signal level.

Therefore, Vs−Vr subtracted by CDS has a minor deviation from the ideal level, and the influence of low-frequency noise can be corrected by CDS. Incidentally, the effect of CDS on low-frequency noise is determined by the noise period and the CDS sampling period; therefore, if the low-frequency noise is noise having a period about two or more times longer than the CDS period, the influence of the noise can be eliminated.

As described above, the influence of low-frequency noise can be eliminated by CDS; however, high-frequency noise cannot be eliminated. Incidentally, FIG. 14 illustrates an example of a dark output state (the reset level≈the signal level) for the sake of simplicity.

Figure 15:
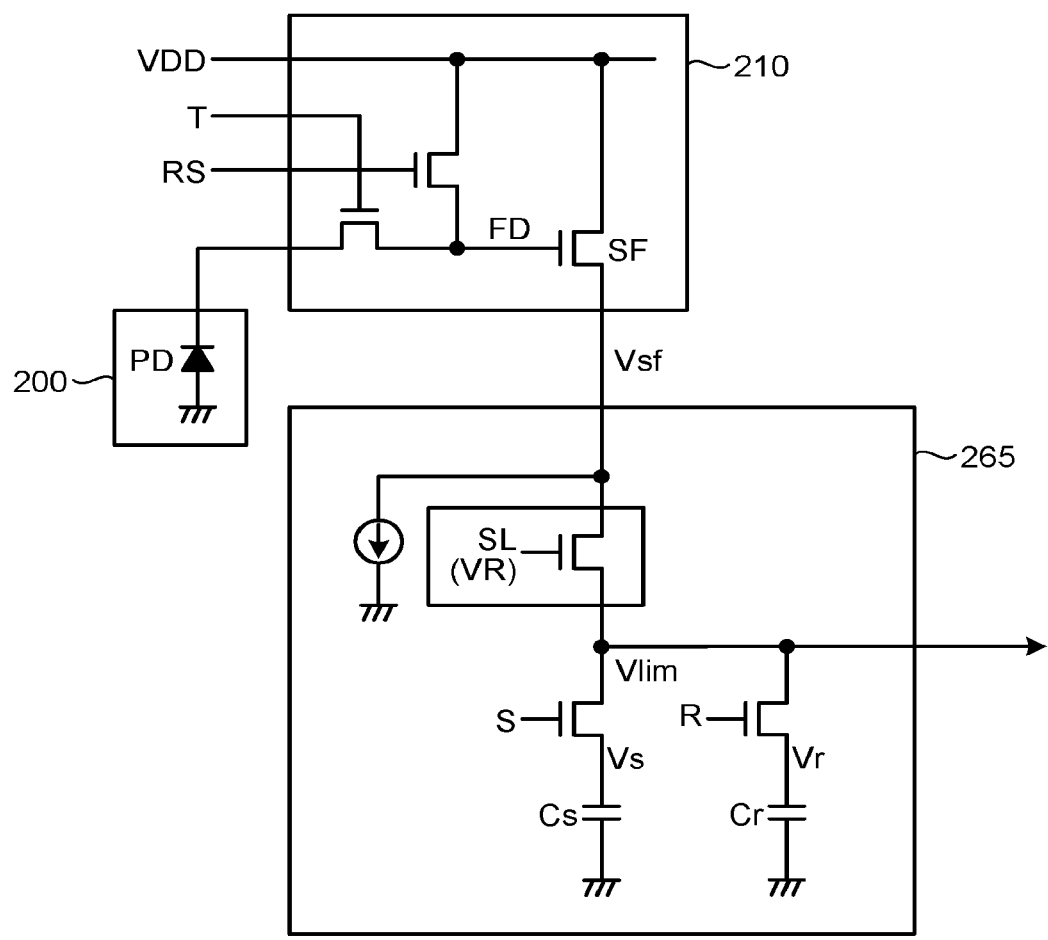
FIG. 15 is a diagram showing a configuration example of a pixel unit having a function corresponding to the band limiting unit.

FIG. 15 is a diagram showing a configuration example of a pixel unit having a function corresponding to the band limiting unit 400, the memory capacitance (Cs), and the memory capacitance (Cr). It is described above that high-frequency noise cannot be eliminated by CDS; however, in other words, that means the influence of low-frequency noise can be eliminated. Furthermore, as shown in FIG. 10, the configuration shown in FIG. 8 secures the responsiveness, and therefore cannot limit low-frequency noise.

A storage unit 265 can minimize the band to be limited, i.e., the influence on responsiveness by setting the pixel selecting switch (SL) as a band limiting unit that limits the band which cannot be corrected by CDS. As described above, a photoelectric conversion element including a pixel unit provided with the storage unit 265 enables the storage unit 265 to suppress high-frequency noise and enables low-frequency noise to be corrected by CDS, and therefore can suppress FPN in the entire frequency band.

Figure 16A:
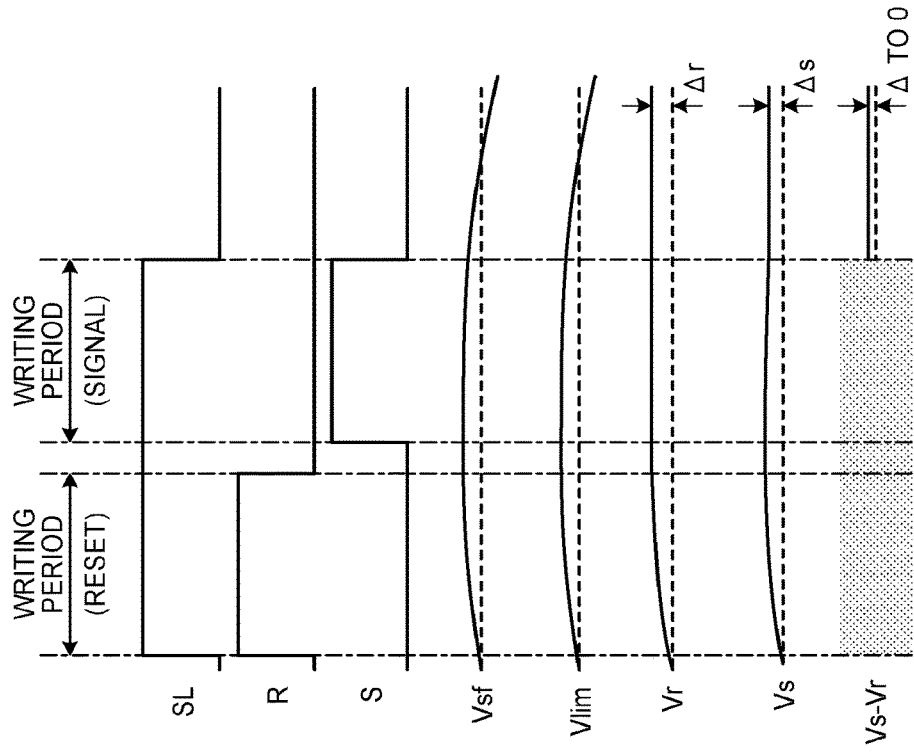
FIG. 16A is a diagram showing the operation of a photoelectric conversion element including the pixel unit shown in FIG. 15.

FIG. 16 is diagram showing the operation of a photoelectric conversion element including the pixel unit shown in FIG. 15. FIG. 16A shows a CDS operation when high-frequency noise is superimposed in the pixel unit shown in FIG. 15. The writing of the reset level and the signal level is the same as in FIG. 14. However, in FIG. 16A, in Vlim, high-frequency noise superimposed on Vsf is suppressed by the storage unit 265. Accordingly, no-error levels of Vr and Vs are written. Therefore, there is no error in Vs−Vr subtracted by CDS.

Figure 16B:
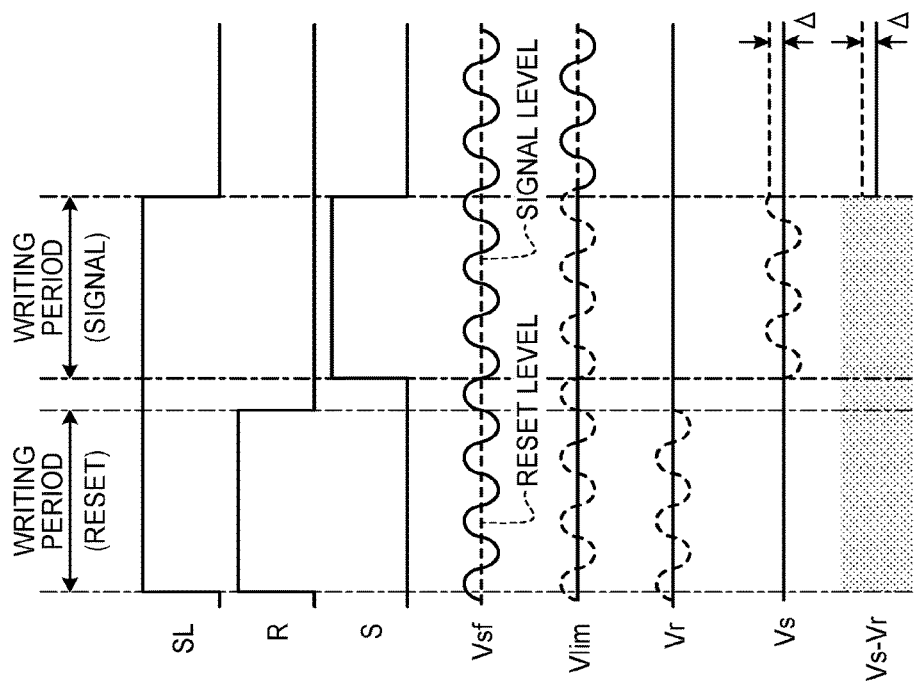
FIG. 16B is a diagram showing the operation of a photoelectric conversion element including the pixel unit shown in FIG. 15.

On the other hand, FIG. 16B shows a CDS operation when low-frequency noise is superimposed. The storage unit 265 cannot limit the low-frequency noise, so the noise superimposed on Vsf is also superimposed on Vlim. The subsequent operation is the same as in FIG. 14B, and because of the low-frequency noise, a deviation in Vs−Vr subtracted by CDS is minor and its influence can be corrected.

As described above, the photoelectric conversion element including the pixel unit provided with the storage unit 265 enables the storage unit 265 to suppress high-frequency noise and enables low-frequency noise to be corrected by CDS, and therefore can suppress FPN in the entire frequency band.

Figure 17:
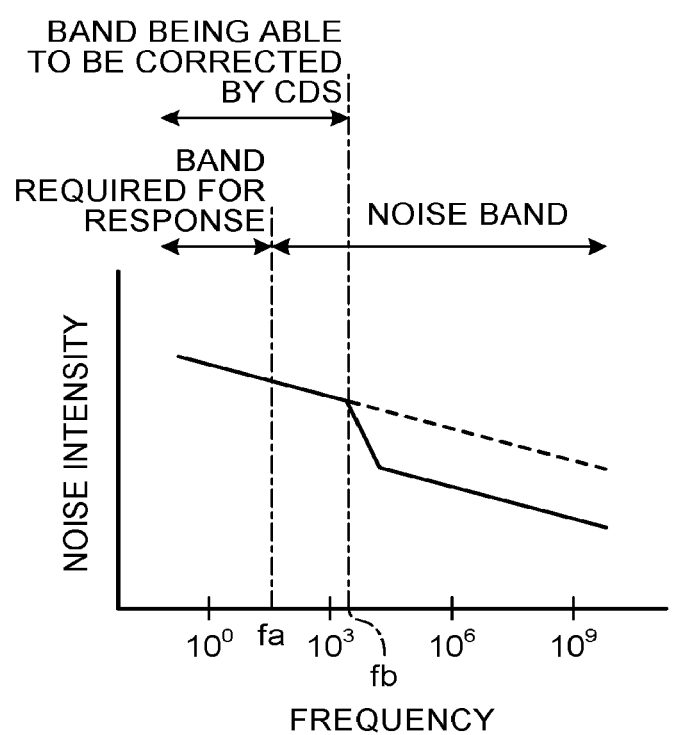
FIG. 17 is a diagram showing a noise spectrum in a photoelectric conversion element including a pixel unit provided with a storage unit.

FIG. 17 is a diagram showing a noise spectrum in the photoelectric conversion element including the pixel unit provided with the storage unit 265. The noise spectrum in FIG. 17 has the same characteristics as in FIG. 10 in that noise exists in the entire frequency band and the noise intensity decreases toward the high-frequency side. However, in FIG. 17, noise on the high-frequency side is reduced as compared with the example shown in FIG. 4A (indicated by a dotted line in FIG. 17). Here, the noise spectrum in FIG. 17 differs from that shown in FIG. 10 in that noise on the low-frequency side is not reduced so as to secure the signal responsiveness and the noise band being able to be corrected by CDS is not limited. In this case, the band being able to be corrected by CDS is on the high-frequency side rather than the band required for a response; therefore, the influence on responsiveness can be minimized by not limiting the CDS band.

Incidentally, the zone up to the frequency fa indicates a band required for a Vsf signal response as described with FIG. 7, and a zone up to fb indicates a noise band being able to be corrected by CDS. Furthermore, the example shown in FIG. 17 shows a state where the band is limited in order from the outside of the band being able to be corrected by CDS, i.e., the uncorrectable band; however, the storage unit 265 can limit the band in order from the band being able to be corrected by CDS.

Figure 18:
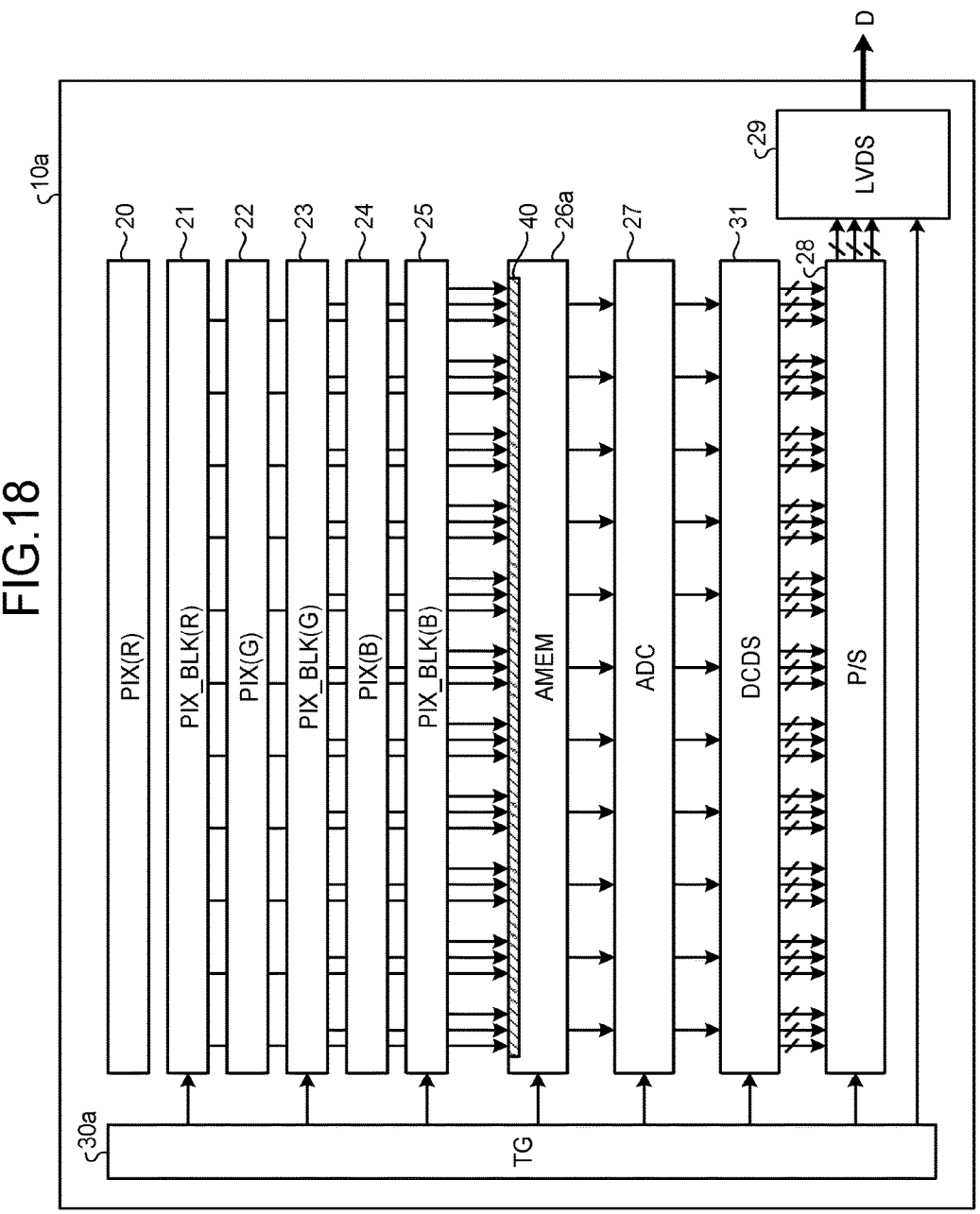
FIG. 18 is a diagram illustrating a configuration of a photoelectric conversion element according to the embodiment.

FIG. 18 is a diagram illustrating a configuration of a photoelectric conversion element 10a according to the embodiment. Incidentally, out of components of the photoelectric conversion element 10a shown in FIG. 18, substantially the same component as the photoelectric conversion element 10 (shown in FIG. 1) is assigned the same reference numeral. An AMEM 26a includes a band limiting unit train 40. The band limiting unit train 40 includes, for example, about seven thousand band limiting units 400 with respect to each color, and suppresses high-frequency noise. Furthermore, the AMEM 26a includes the memory capacitance (Cs) and the memory capacitance (Cr). Incidentally, instead of the band limiting unit train 40, the AMEM 26a can be configured to include about seven thousand storage units 265 with respect to each color.

Then, signals with noise suppressed by the AMEM 26a are read out with respect to each pixel and held into each memory capacitance in the AMEM 26a as well, and the held signals are sequentially read out onto the ADC with respect to each of RGB colors. As this AMEM 26a holds signals, a global shutter system in which the operation timings, i.e., the exposure timings of the pixel 200 and the pixel circuit 210 are the same among RGB is achieved.

The ADC 27 includes as many AD converters as the number of columns, and sequentially converts image signals from analog to digital on a column-by-column basis. A digital CDS (DCDS) 31 performs CDS using the reset level and signal level output from the ADC 27. A timing control unit (TG) 30a controls the units composing the photoelectric conversion element 10a. The band limiting units 400 can be configured to be included in the pixel circuit 210.

The photoelectric conversion element 10a can suppress vertical stripes caused by FPN. Incidentally, in a case of an area sensor, FPN is generated with respect to each of pixels arranged in two dimensions, so although S/N deterioration is generated, but it is not such fatal deterioration in the image quality as vertical stripes.

Figure 19:
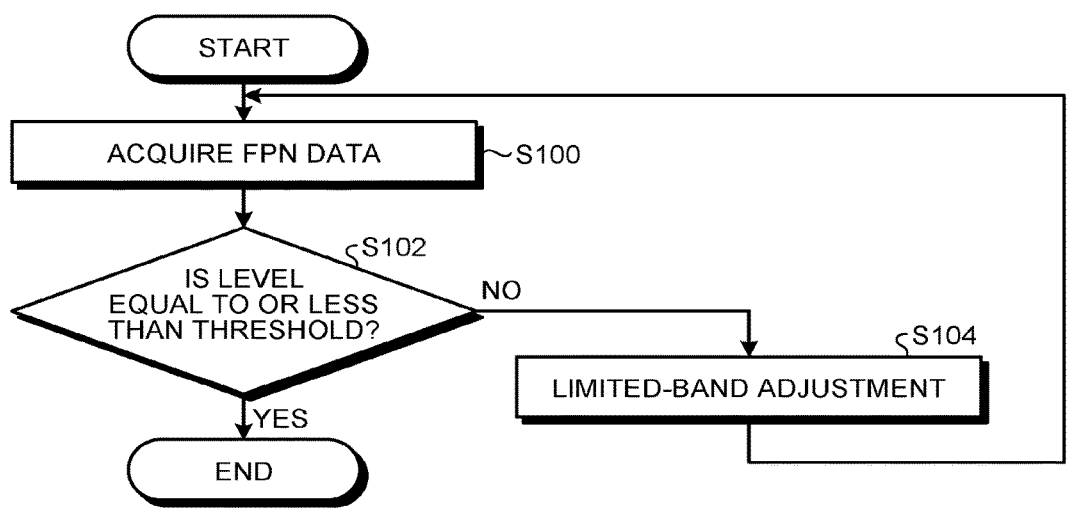
FIG. 19 is a flowchart showing a band-limitation adjusting method.

Subsequently, a method for adjusting the band limitation is explained. FIG. 19 is a flowchart showing the band-limitation adjusting method. In the pixel unit shown in FIG. 11, the band limitation by the band limiting unit 400 can be changed, thereby the pixel unit can respond to individual differences in noise among the PDs; yet, if the band is adjusted by detecting the FPN level, the optimum band can be set with respect to each individual.

As shown in FIG. 19, at the start of the adjustment, a user first acquires FPN data (Step S100). The FPN data can be easily acquired by acquiring image data in a dark state. The user determines whether the level acquired through "FPN data acquisition" is equal to or less than a threshold (Step S102). When the level is equal to or less than the threshold (YES at Step S102), the user ends off the adjustment; however, when the level exceeds the threshold (NO at Step S102), the user changes the limited band through "limited-band adjustment" (Step S104).

In the process at Step S104, as shown in FIG. 11, the band is changed by changing VR voltage, and, in this case, varies in a direction of further limiting the band to lower the FPN level. Then, the user again acquires FPN data (Step S100), and determines whether the acquired level is equal to or less than the threshold (Step S102). As described above, the optimum band can be set by adjusting the limited band with respect to each individual. Incidentally, the above is a basic adjustment method, and an upper limit can be set on the number of times of loop processing in the threshold determination or band adjustment, or the limited band can be calculated by an arithmetic operation according to a value of FPN level to reduce the number of times of loop processing.

Figure 20A:
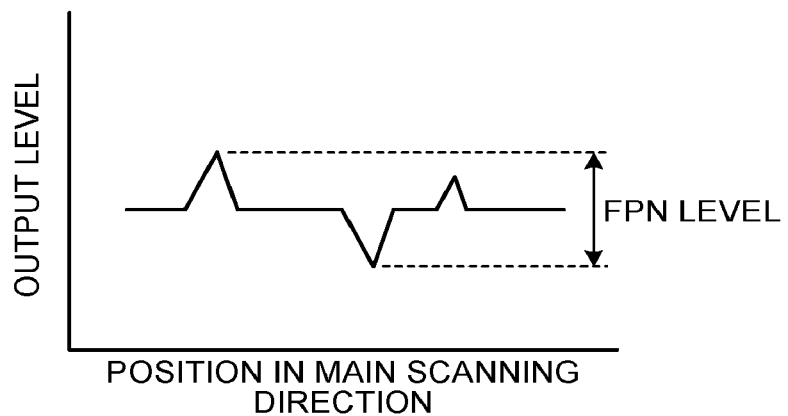
FIG. 20A is a diagram showing a state before adjustment.
Figure 20B:
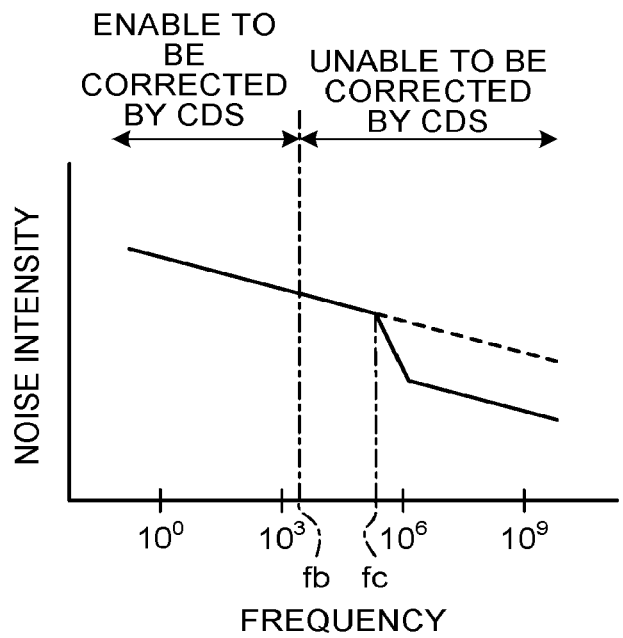
FIG. 20B is a diagram showing a state before adjustment.

Subsequently, the operation of the photoelectric conversion element in the limited-band adjustment is explained. FIG. 20 shows a state before the adjustment; FIG. 20A is a diagram showing main-scanning output data in the dark state, and FIG. 20B is a diagram showing a noise spectrum. Here, a difference between the maximum and minimum values in an output level distribution of the main-scanning-direction output data is defined as an FPN level.

A frequency fb in the noise spectrum is an upper limit noise frequency being able to be corrected by CDS, and fc indicates a cutoff frequency of a band limited by a band limiting unit. Before the band adjustment shown in FIG. 20, a value of fc is higher than fb when viewed from the noise spectrum; therefore, the band being unable to be corrected by CDS cannot be limited entirely. Therefore, as shown in the main-scanning level distribution, some degree of FPN level is generated.

Figure 21A:
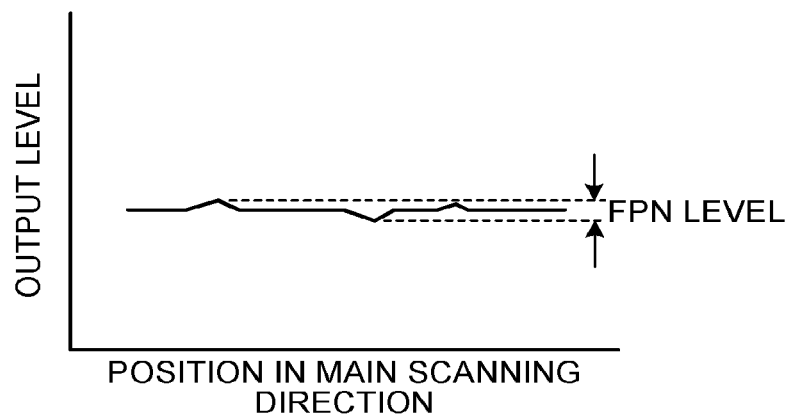
FIG. 21A is a diagram showing a state after the adjustment.
Figure 21B:
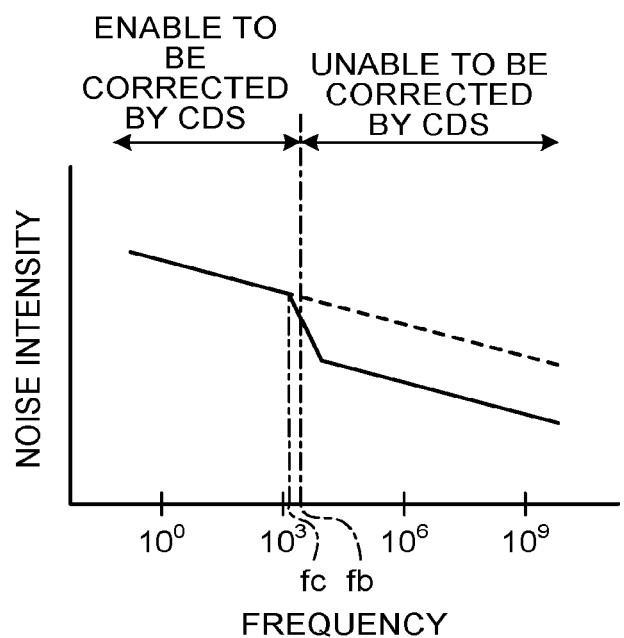
FIG. 21B is a diagram showing a state after the adjustment.

FIG. 21 shows a state after the adjustment. In the band adjustment, the band to be adjusted is changed so that fc falls below fb as shown in FIG. 21 after the adjustment. Then, the noise band being unable to be corrected by CDS, which has been unable to be limited in FIG. 20, is limited, and the FPN level is reduced as shown in the main-scanning level distribution.

Figure 22:
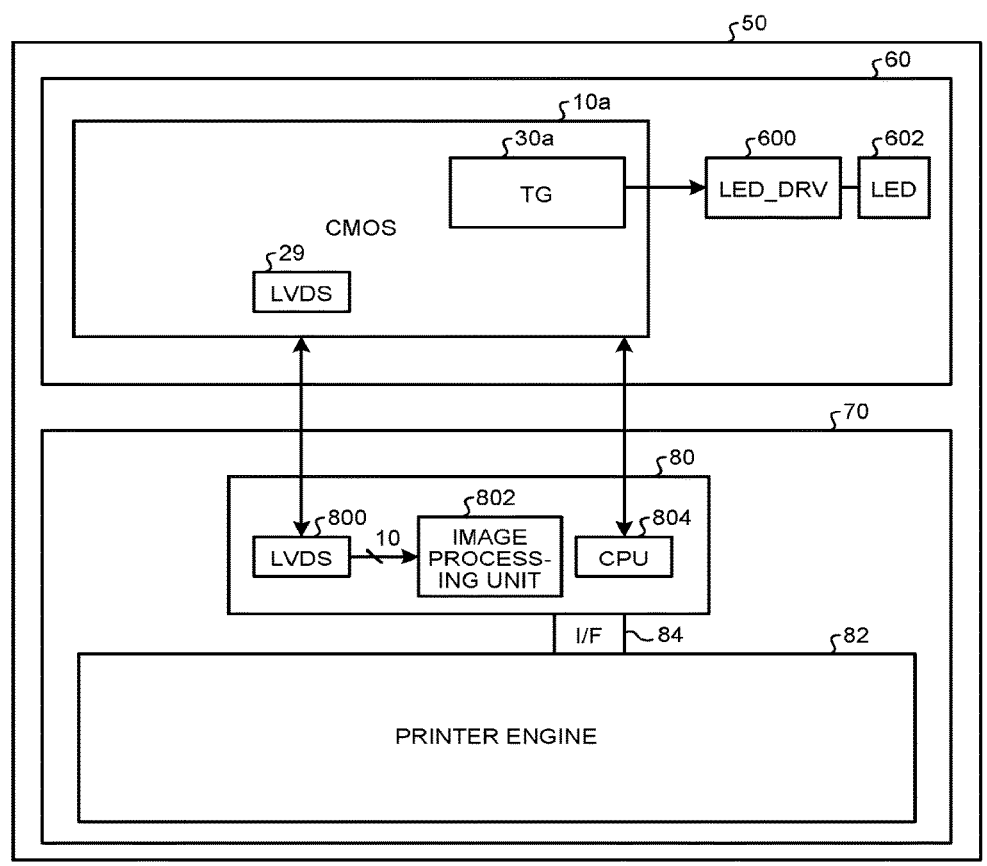
FIG. 22 is a diagram showing an outline of an image forming apparatus including an image reading device provided with, for example, the photoelectric conversion element.

Subsequently, an image forming apparatus including an image reading device provided with the photoelectric conversion element 10a according to the embodiment is explained. FIG. 22 is a diagram showing an outline of an image forming apparatus 50 including an image reading device 60 provided with, for example, the photoelectric conversion element 10a. The image forming apparatus 50 is, for example, a copier or multifunction peripheral (MFP) including the image reading device 60 and an image forming unit 70.

The image reading device 60 includes, for example, the photoelectric conversion element 10a, an LED driver (LED DRV) 600, and an LED 602. The LED driver 600 drives the LED 602 in synchronization with a line synchronization signal output from the timing control unit (TG) 30a or the like. The LED 602 irradiates an original with light. In synchronization with a line synchronization signal or the like, the photoelectric conversion element 10a receives a reflected light from the original, and a plurality of PDs (not shown) starts generating and accumulating electric charge. Then, after the photoelectric conversion element 10a performs an AD conversion, a parallel-serial conversion, etc., the photoelectric conversion element 10a outputs image data to the image forming unit 70.

The image forming unit 70 includes a processing unit 80 and a printer engine 82; the processing unit 80 and the printer engine 82 are connected via an interface (I/F) 84.

The processing unit 80 includes an LVDS 800, an image processing unit 802, and a CPU 804. The CPU 804 controls the units, such as the photoelectric conversion element 10a, composing the image forming apparatus 50. Furthermore, the CPU 804 (or the timing control unit 30) controls the PDs so that the PDs each start generating electric charge according to an amount of light received at almost the same time.

The photoelectric conversion element 10a outputs, for example, imaged data of an image read by the image reading device 60, a line synchronization signal, a transmission clock, etc. to the LVDS 800. The LVDS 800 converts the received imaged data, line synchronization signal, transmission clock, etc. into parallel 10-bit data. The image processing unit 802 performs image processing using the converted 10-bit data, and outputs the imaged data etc. to the printer engine 82. The printer engine 82 prints out the received imaged data.

According to the present invention, it is possible to reduce fixed pattern noise while securing the necessary response speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A photoelectric conversion element comprising:
   a light receiving element that generates electrical charge according to an amount of light received;

a buffer unit that buffers and outputs a voltage signal according to the electrical charge generated by the light receiving element;
a current control circuit that controls, when the buffer unit outputs the voltage signal, electric current flowing through the buffer unit so as to be a predetermined amount of electric current; and
an elimination circuit that eliminates high-frequency components in a band equal to or higher than a predetermined band from the voltage signal output from the buffer unit.

2. The photoelectric conversion element according to claim 1, wherein
the elimination circuit includes a MOS transistor, and
the band of high-frequency components to be eliminated is determined in advance according to size of an on-resistance of the MOS transistor.

3. The photoelectric conversion element according to claim 2, wherein
the elimination circuit includes a node to which an arbitrary voltage can be applied so that a value of the on-resistance of the MOS transistor can be changed.

4. The photoelectric conversion element according to claim 1, further comprising a CDS unit that performs correlated double sampling on the voltage signal output from the buffer unit, wherein
the elimination circuit eliminates high-frequency components in a band higher than a band of frequency components that the CDS unit can eliminate from the voltage signal output from the buffer unit.

5. The photoelectric conversion element according to claim 1, wherein
the light receiving elements are arranged in one direction with respect to each color of light received.

6. The photoelectric conversion element according to claim 5, wherein
the elimination circuit eliminates high-frequency components so that fixed pattern noise generated in the light receiving element is equal to or less than a predetermined threshold.

7. An image reading device according to claim 1, comprising the photoelectric conversion element of claim 1.

8. An image forming apparatus according to claim 7, comprising:
the image reading device of claim 7; and
an image forming unit that forms an image on the basis of output of the image reading device.

9. A photoelectric conversion method performed by a photoelectric conversion element, the method comprising:
generating, by a light receiving element, electrical charge according to an amount of light received;
buffering and outputting, by a buffer unit, a voltage signal according to the electrical charge generated at the light receiving element;
controlling, by a current control circuit, when the buffer unit outputs the voltage signal, electric current flowing through the buffer unit so as to be a predetermined amount of electric current; and
eliminating, by an elimination circuit, high-frequency components in a band equal to or higher than a predetermined band from the voltage signal output from the buffer unit.

10. A photoelectric conversion element comprising:
light receiving means for generating electrical charge according to an amount of light received;
buffer means for buffering and outputting a voltage signal according to the electrical charge generated by the light receiving means;
current control means for controlling, when the buffer means outputs the voltage signal, electric current flowing through the buffer means so as to be a predetermined amount of electric current; and
elimination means for eliminating high-frequency components in a band equal to or higher than a predetermined band from the voltage signal output from the buffer means.

* * * * *